Patented June 3, 1941

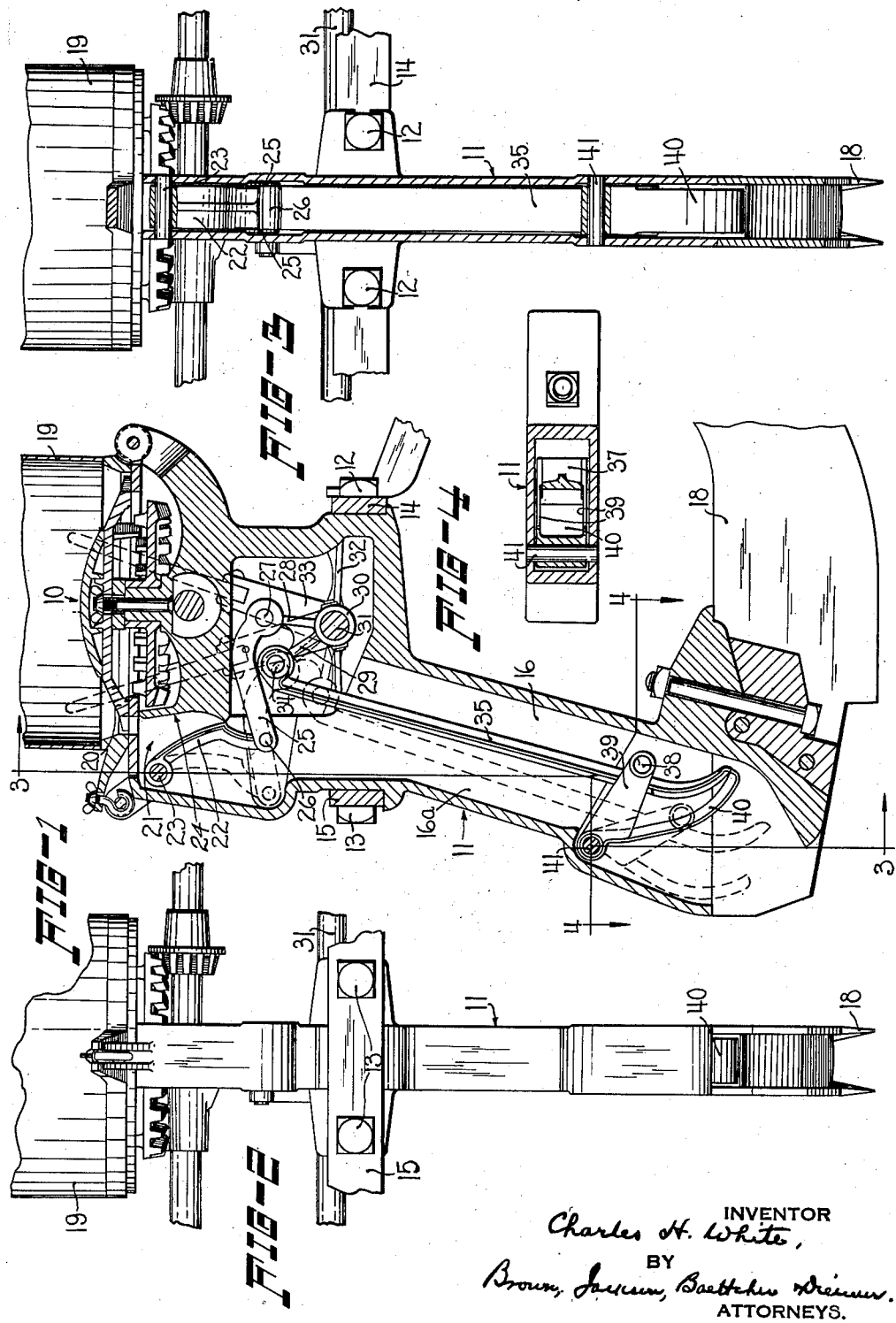

2,243,933

UNITED STATES PATENT OFFICE 2,243,933

PLANTING MECHANISM

Charles H. White, Moline, Ill., assignor to Deere & Company, Moline, Ill., a corporation of Illinois Application March 14, 1936, Serial No. 68,833
Renewed February 17, 1940

27 Claims. (Cl. 111—51)

This invention relates to planting implements designed for check row planting, and has more particularly to do with improvements in the mechanism for dropping the seed in the furrow. A planter of this general type is illustrated and described in Patent No. 1,951,458, issued to me on March 20, 1934, and the present invention contemplates certain improvements in the design and operation of the seed dropping valves shown in such patent.

In planters of this type the seed is delivered from the hopper by a seed delivery plate which drops the seed one at a time onto an upper valve, and in prior constructions such as that shown for example in my above mentioned patent the upper valve member is so formed as to present a substantially horizontal surface upon which the seed drops, and with such constructions it sometimes happens that the seed rebounds upwardly before coming to rest on the upper surface of the valve. It has been found that this type of valve operates satisfactorily when the planter is operated at a planting speed of approximately three to three and one-half miles per hour, because in that case all the seed, including the last seed when as many as four seeds are selected and dropped by the seed delivery plate, have time to come to rest on the upper valve in the time elapsing between the release of the last seed by the seed delivery plate and the commencement of the opening or operation of the valve. However, as the speed of the planter is increased the intervals between the opening and closing cycles of the valve become shorter while the velocity of the seed in dropping from the seed delivery plate to the valve remains the same as before, and in such cases the time available for the seed to come to rest on the valve before the opening of the valve therefore becomes less and less. In such a situation, when the speed of the planter is appreciably increased the last seed delivered by the seed delivery plate is frequently trapped by the reclosing of the valve, because of the seed having rebounded upwardly after striking the upper surface of the valve, instead of escaping from the valve with the other seeds during the interval that the valve is in open position. This trapped seed, therefore, is held by the valve and is released with the next charge of seed, and in such a case less than a full hill of seed is discharged at one interval of operation of the valve while the succeeding charge has an excessive number of seeds. This unequal distribution of seeds in hill planting is of course not desirable. Furthermore, it sometimes happens that the last seed is trapped between the edge of the valve and the side of the chute, and in some positions of the trapped seed the opening between the valve and the side of the chute may be even large enough to allow some or all of the seed of the succeeding charge to escape therethrough and in such a case the seed is also dropped through the lower valve which is interconnected with the upper valve and likewise held open, whereby the seed will be scattered along in the furrow before the point of the next hill is reached where the seed should normally be dropped in hill planting.

Also, in the construction shown in my prior patent in which the lower valve is provided with an ejector face, unless the seed comes to rest on the surface of the lower valve in actual contact with such ejector face, the seed will be discharged from the surface of the valve with a punching or flicking action instead of being merely pushed off the surface of the lower valve, with the result that the seed will bounce rearwardly beyond the desired point in the furrow for proper hill planting.

With the above in view it is the principal object of the present invention to provide seed-drop valves for planters of this type in which the valves are provided with surfaces that intersect the path traversed by the dropping seed at an angle sufficient to deflect the seed downwardly toward the exit points of the valves when the seed rebounds, rather than horizontally or upwardly, and to form a pocket in which the rebound oscillations of the seed are rapidly damped and the seed quickly brought into a state of rest, whereby the proper number of seeds will be delivered by the valves at all times to the furrow and at the proper point in the furrow to accomplish accurate hilling of the seed.

It is another object of the present invention to provide a valve, particularly in the case of the lower valve mechanism, in which the walls lie at such an angle with respect to each other that the falling seed quickly come to rest by the friction applied against both sides of the seed by the walls and by virtue of the wedging of the seed in between the walls.

A further object of the present invention is to provide an ejector valve arrangement in which all of the seed to be planted are caused to lie in direct contact with the ejector member whereby the seed is expelled with a steadily applied force rather than a punch or an impact, which would occur if contact between the seed and the ejecting member is not maintained.

Other objects and advantageous features of the present invention will appear from the following description of the preferred embodiment of my invention taken in connection with the accompanying drawing, in which—

Figure 1 is a fragmentary sectional view showing parts of a check row planter, the valve mechanism thereof being shown in elevation;

Figure 2 is a rear elevational view of the parts shown in Figure 1;

Figure 3 is a vertical cross-sectional view through the furrow runner shank taken substantially on the plane of the line 3—3 of Figure 1 and showing the upper and lower valve mechanism in elevation; and Figure 4 is a horizontal cross-sectional view taken substantially on the plane of the line 4—4 of Figure 1 and illustrating the lower valve mechanism.

Inasmuch as the type of planter in which my improvements have been incorporated is old and well known in the art, it is not thought necessary to completely illustrate the same herein, and hence only such parts of the planter as are necessary to an understanding of the present invention have been shown in the drawing.

Referring to the drawing, the seed selecting and feeding device is indicated as an entirety by the reference numeral 10, and it is suitably supported in the usual manner at the upper end of a furrow runner shank 11 secured by bolts 12 and 13 to the front frame bars 14 and 15, respectively, of the planter. This runner shank, as usual in planters of this type, is hollow to provide a passageway 16 wherein the upper and lower seed valves and the valve actuating mechanism are mounted and through which the seed drops into the furrow opened by a runner or furrow opener 18. A seed hopper 19 is supported at the upper end of the runner shank 11 above the seed feeding device 10. The seed feeding device is adapted to drop a predetermined number of seeds into a seed chamber 21 at the upper end of the passageway 16 according to the actuation of a seed plate 20 forming a part of the seed feeding device.

A valve 22 pivotally mounted at its upper end within the hollow runner shank 11 as indicated at 23 cooperates with the inner face 24 of the runner shank to form the chamber 21 and to intercept the seed dropped into the chamber from the seed feeding device 10. The valve 22 is moved into open and closed position by suitable mechanism including a pair of links 25 having one end pivotally connected as shown at 26 to the lower end of the valve 22, one at each side thereof. The opposite ends of the links 25 are pivotally connected as shown at 27 to the upper end of an arm 28 which at its lower end is formed integral with another arm 29 through a common sleeve 30 fixed on a rock shaft 31. The rock shaft 31 has bearing support at its outer ends in check head brackets 32. One of these brackets is shown in Figure 1, and they are secured in any suitable manner to the frame bars 14 and 15 of the planter frame. Connected in any suitable manner to the outer end of the rock shaft 31 is a check fork 33, said fork being movable between the positions shown in full and dotted lines in Figure 1, under the control of a check wire not shown. As is understood by those skilled in the art, in the operation as a check row planter, buttons on a check wire stretched across the field are adapted to actuate the check fork 33 to rock the rock shaft 31.

Pivotally connected at 34 to the upper end of the arm 29 on the rock shaft 31 is the upper end of an operating member or link 35 which extends downwardly in the passageway 16 in the runner shank to a position in proximity to the discharge end of said shank. As shown in Figure 3, this operating member or link 35 is in the form of a relatively flat strip of such a width that it forms one wall of a seed passage 16a through the runner shank and has its side edges spaced only far enough from the inner surfaces of the side walls of the runner shank to permit movement of the member within the shank, but the spaces between the side edges of the member 35 and the walls of the runner shank are not sufficient to permit seed to pass through or become wedged therebetween. Adjacent its lower end the member 35 carries an apertured lug 37 (Figure 4) which receives a pivot pin 38 (Figure 1) by which the member 35 is pivotally connected to one end of a pair of vertically positioned plate members or wings 39, one of which is positioned in close proximity to each of the opposite side walls of the runner shank as best shown in Figure 4. The opposite ends of the plate members or arms 39 are formed integrally with a valve 40 pivotally mounted at its upper end in the runner shank 11 as shown at 41. This lower valve is so formed that its lower edge abuts against the lower edge of the operating member 35 when the valve is in closed position. As clearly shown in full lines in Figure 1, the lower ends of the members 35 and 40 curve forwardly in converging relation for a purpose which will appear later.

As the arms 28 and 29, fixedly secured to the rock shaft and which are respectively connected as above described to the valves 22 and 40, are moved in unison by the check fork actuated rock shaft, movement of the valve 40 and the actuating member 35 into closed position with their lower edges in abutment as shown in full lines in Figure 1, and movement into open position as shown in dotted lines in Figure 1, occurs simultaneously with corresponding movements of the upper valve 22, the closed and open positions of which being also shown in full lines and dotted lines, respectively, in Figure 1.

In operation, as the seed is dropped by the seed feeding device into the chamber 21, its movement is checked by striking the face of the valve 22 at a relatively small angle of incidence. From the valve 22 the seed is deflected into contact with the wall 24 of the shank which forms the opposite side wall of the chamber 21, and possibly back again against the valve 22, and as the valve and the side wall define a relatively sharp angular V-shaped pocket the direction of the deflection is always sharply downward and toward the apex of the angle formed by the valve 22 and the side wall 24. By virtue of this arrangement movement of the seed is quickly arrested or damped and the seed promptly comes to rest in the lower end of such V-shaped pocket. By this construction the rebounding of the seed upwardly is prevented, as the seed rebounds from both the wall 24 and the valve 22 always in a downward direction. Thus, the seed released by the seed plate comes to rest in the chamber above the upper valve in a much shorter time than if dropped onto a relatively horizontal surface.

With respect to the lower valve, it will be noted that the lower end portion of the actuating member 35 and the valve 40 also form such an angle or approximately V-shaped pocket that the inner surfaces of said members are adapted to apply a wedging friction to the opposite sides of the seed when the seed dropped from the upper valve reaches such V-shaped pocket, and the seed comes promptly to rest in the lower end of such pocket. It will thus be seen that the angle between the walls of the lower valve means, as well as the upper valve means, is such that the rebound oscillations of the seed are quickly damped, and the seed promptly brought to rest, so as to facilitate operating the planter unit at an appreciably greater speed than has hitherto been feasible. It will also be seen, particularly from Figure 1, that the upper surface at the lower end of the member 40 serves as a seed receiving surface which holds the seed up against the generally downwardly and rearwardly facing surface at the lower end of the member 35, which constitutes a seed ejecting face, as pointed out below. On the opening of the lower valve the actuating member 35 moves downwardly and rearwardly and through its interconnection with the valve 40 through the plate members 39 also moves said valve downwardly and rearwardly to open the pocket. Owing to the V-shaped formation of the pocket the seed in the lower valve is always in contact with the actuating member, and movement of such actuating member in the valve opening operation expels the seed with a steadily applied pushing force rather than with a punching or impact action as would be the case if the seed were not in contact with the actuating member 35 when the valve is opened.

After the upper and lower valves have been opened, they occupy the positions shown in dotted lines in Figure 1. The opening of the lower valve ejects the seeds with a pushing action, as explained above, and the opening of the upper valve permits the seed accumulated thereon to fall toward the lower valve. However, by the time the seed start their downward movement the valves and associated parts start to move from their dotted line position (Figure 1) to their full line position. Thus, it will be seen that the movement of the part 35 when the valves are closing is generally away from the path of movement of the seed falling from the upper valve to the lower valve. In effect, this widens the seed passageway and is a construction which has the advantage that there is no danger of any part of the member 35 striking the falling seed and causing the same to be deflected out of its downward path. If, for example, the member 35 moved in the other direction while the seed are falling from the upper valve toward the lower valve, there might be some danger of the seed rebounding back and forth after being struck by the member 35.

I claim:

1. A planter including a seed feeding device, a furrow opener, a shank member having a seed receiving chamber at its upper end and a passage leading from said chamber to a point rearwardly of said furrow opener, a valve member pivotally supported at its upper end in said shank member and extending downwardly and laterally into contact with one side wall of said chamber to form a substantially V-shaped pocket when the valve is closed, a second valve member pivotally supported at its upper end in said passage adjacent the lower end thereof, means for actuating said valve members in unison, said actuating means including a plate forming one wall of a seed passage in said shank, the lower end of said plate and said second valve member forming a substantially V-shaped pocket when the valve is closed.

2. A planter including a hollow runner shank, an ejector mechanism in the runner shank comprising a vertically extending push plate, and a valve member pivotally mounted in said passageway and arranged so as to engage the lower portion of said push plate and to form therewith a substantially V-shaped seed confining chamber in which the seed comes to rest substantially against said push plate just before the seed is ejected, and means interconnecting such push plate with said valve member whereby said valve member is opened upon actuation of said push plate, the lower portion of said push plate and valve member being curved whereby the lower portion of said push plate is positioned over the lower portion of said valve member and in a position to contact the seed and expel the latter with a downward pushing force applied directly to the seed upon opening of said valve.

3. A planter including a hollow runner shank, an ejector mechanism in the runner shank comprising a vertically extending push plate having a downwardly facing seed contacting surface, and a valve member pivotally mounted in said passageway and forming with the downwardly facing portion of said push plate a substantially V-shaped receptacle in which the seed is lodged in contact with said downwardly facing portion of the push plate, whereby the latter acts to push out the seed with a downward pushing force applied directly to the seed from above upon opening of said valve.

4. A planter comprising the combination of a seed feeding device, actuating means therefor, a furrow opener, a shank member, said shank member having a passage extending therethrough below said seed feeding device, upper and lower valves in said passage, means for actuating said valves in unison, said means comprising a rock shaft, a sleeve fixed to said rock shaft, an arm formed integral with said sleeve and adapted to actuate the upper valve, and a second arm formed integral with said sleeve and adapted to actuate said lower valve.

5. A planter comprising the combination of a seed feeding device, actuating means therefor, a shank member having a passage extending therethrough below said seed feeding device, upper and lower valves in said passage, means for actuating said valves in unison, said means comprising a rock shaft, a sleeve fixed to said rock shaft, an arm formed integral with said sleeve and adapted to actuate the upper valve, a second arm formed integral with said sleeve, an ejector member pivotally connected with said arm, and means connecting said ejector member with said lower valve for opening the same.

6. In a planter having a seed feeding device and a hollow shank member to receive the seed, the combination of valve mechanism controlling the passage of the seed through the shank member, said valve mechanism comprising an upper valve member, means for actuating said upper valve member, a generally vertically arranged lower valve member in said shank member pivotally mounted therein at its upper end, means for actuating said lower valve member, said last named actuating means including an ejector member cooperating with the lower part of said lower valve member to form a substantially V-shaped pocket whereby the seed delivered to said lower valve member will lie in contact with said ejector member so that said ejector member operates to push the seed toward the ground on the opening of the valve.

7. In a planter having a seed feeding device and a hollow shank member to receive the seed, the combination of a valve mechanism controlling the passage of the seed through the shank member, said valve mechanism comprising an upper valve member, a lower valve member in said shank member for generally downward and rearward swinging movement, means for actuating said valve members in unison, said means including an ejector member engageable with the lower portion of said lower valve member to form a substantially V-shaped pocket whereby the seed delivered to said lower valve will lie in contact with said ejector member whereby said ejector member will push the seed toward the ground on the opening of the valve.

8. A planter including a seed feeding device, a hollow runner shank having a chamber arranged to receive the seed from said seed feeding device, an upper valve member pivotally mounted in said chamber, means for actuating said upper valve member, said actuating means comprising a pair of arms pivotally connected to said valve member at opposite sides thereof, an ejector mechanism in the runner shank comprising a substantially vertically extending push plate forming one wall of a seed passageway through said shank, a lower valve member pivotally mounted in said passageway and forming with the lower portion of said push plate a chamber in which the seed comes to rest before being ejected, a pair of arms carried by the lower valve member on opposite sides of said seed passageway and embracing said push plate, and means pivotally connecting said arms with said push plate adjacent the lower end thereof.

9. A planter including a passageway, an ejector mechanism comprising a substantially vertically extending push plate having a lower surface, and a valve member pivotally mounted in said passageway and forming with said push plate a seed receiving chamber, said valve member extending generally downwardly alongside said push plate and disposed close to the latter so as to hold the seed against the lower surface of said push plate whereby said push plate acts to push the seed outwardly of the runner shank in the ejection of the seed.

10. A planter including a passageway, an ejector mechanism in said passageway comprising a substantially vertically extending push plate terminating in a lower angled section disposed generally at right angles to the path of movement of the seed during their discharge, and a valve member movably mounted in said passageway and including a generally downwardly extending part having a lower portion disposed against said lower angled push plate section below the latter so as to form therewith a seed-receiving chamber having walls disposed relative to one another at an acute angle in which the seed delivered thereto quickly come to rest, and means for operating said ejector mechanism so that said push plate section exerts a positive ejecting force against the seed.

11. A planter comprising a body including a seed feeding device, a pair of generally vertically disposed members normally converging downwardly with their lower ends in contact with each other to receive between them seed from said feeding device, the lower end of one of said members being formed so that the surface thereof receiving the seed faces generally in a downward direction, and means for swinging said members rearwardly to separate their lower ends and swing said surface downwardly against the seed to eject the seed.

12. A planter comprising a vertically disposed hollow runner shank, a seed feeding device disposed at the upper end of said shank and a valve disposed at the lower end of said shank, said valve comprising a pair of members pivotally connected to said shank for fore and aft swinging movement, said members curving downwardly and forwardly and normally disposed in contact with each other at their lower ends, for receiving seed from said feeding device, and means for swinging said members rearwardly and separating their lower ends for ejecting the seed.

13. A planter comprising a body including a seed feeding device, a pair of generally vertically disposed members normally converging downwardly and forwardly toward each other with their lower ends in contact to provide a downwardly and forwardly tapering passage for receiving seeds from said feeding device, actuating means for said members, and means connecting said members together and to said body providing for rearward and downward movement of said members, operation of said actuating means acting through said connecting means to cause a separation of said members to eject the seed.

14. A planter including a hollow runner shank, an ejector mechanism in said shank comprising a substantially vertically extending push plate swingably disposed in said shank and having at its lower end a forwardly curved portion, a gate member pivotally mounted in said shank behind said push plate and curving forwardly under said forwardly curved portion of the latter to form a forwardly tapering seed receiving passage between said push plate and said gate member, and means for separating said push plate and said gate to discharge the seed and at the same time imparting a downward and rearward movement of said push plate to exert a positive ejecting force against the seed.

15. A seed valve for a planter comprising a first part having an ejecting face and mounted for movement to discharge the seed, and means cooperating therewith for holding the seed substantially in contact with said face until said part is moved to discharge the seed, whereby the seed is ejected by said part with a pushing action.

16. Seed ejecting mechanism comprising two movable members contacting at one portion of each and diverging therefrom to form a seed receiving pocket, one of said members having a seed ejecting face disposed generally perpendicular to the path of movement thereof and the other member being disposed close enough to said face to hold seed against the latter, and means for moving said one member along said path and the other member faster than and away from said one member, for opening said pocket and pushing the seed outwardly therefrom.

17. Seed ejecting mechanism comprising two movable members, each having a downwardly and forwardly disposed lower portion, contacting at their lower ends and said downwardly and forwardly disposed portions diverging upwardly from the point of contact so as to form a seed receiving pocket, one of said members having a seed ejecting face at its lower end, means adjacent the lower end of said one member for pivotally supporting the latter whereby the lower end thereof swings in a generally downwardly and rearwardly extending arc for ejecting said seed, and means for moving the other member generally downwardly and rearwardly away from said one member for opening said pocket to accommodate discharge of the seed therefrom by said seed ejecting face.

18. Seed ejecting mechanism comprising two movable members having downwardly and forwardly extending parts contacting at their lower ends and spaced apart at their upper ends to form a seed receiving pocket in which the seed therein is held substantially in contact with the lower face of one of said parts, means for moving said one part in a direction to eject the seed from said pocket with a downward and rearward pushing action, and means for moving the other part away from said one part faster than the latter is moved so as to open said pocket so as to eject the seed.

19. Valve mechanism for a planter or the like, comprising a first part having a seed receiving face, a second part having a seed ejecting face, said parts being arranged to form a substantially V-shaped pocket whereby seed delivered thereto will be held by said seed receiving face against said ejecting face, and means for moving said first part away from said second part and simultaneously moving the latter in a direction to eject said seed with a pushing action.

20. Valve mechanism for a planter or the like, comprising a valve member, means for actuating said valve member including an ejector member cooperating with said valve member to form a substantially V-shaped pocket whereby the seed delivered to said valve member will lie in contact with said ejector member so that said ejector member operates to push the seed toward the ground on the opening of the valve.

21. Valve mechanism for a planter or the like, comprising an ejector member having a generally downwardly facing seed receiving surface, a movable valve member cooperating with said ejector member when the valve is closed to form a substantially V-shaped pocket adapted to receive seed and to damp rebounding of the seed, said valve member being formed so as to hold the seed substantially in contact with the generally downwardly facing surface of said ejector member, and means for opening said valve member and simultaneously operating said ejector member to push the seed generally downwardly toward the ground.

22. Valve mechanism for a planter or the like, comprising an ejector member having a generally downwardly facing seed receiving surface, a movable valve member cooperating with said ejector member when the valve is closed to form a substantially V-shaped pocket adapted to receive seed and to damp rebounding of the seed, said valve member being formed so as to hold the seed substantially in contact with the generally downwardly facing surface of said ejector member, a pair of arms fixed to one of said members and embracing the other member, and means operatively connecting the ends of said arms with said other member whereby when said valve member is opened said ejector member is simultaneously actuated to push the seed generally downwardly toward the ground.

23. In a planter having a seed feeding device and a hollow shank to receive the seed, valve mechanism controlling the passage of the seed through the shank member, comprising an upper valve and means cooperating therewith when the valve is closed to form a substantially V-shaped pocket adapted to damp the rebounding of seed dropped into the pocket, lower valve means in said hollow shank including an ejector member having a generally downwardly facing seed receiving surface and a movable valve member cooperating with said ejector member when the valve is closed to form a substantially V-shaped pocket adapted to receive seed from said first mentioned pocket and to damp rebounding of the seed, said valve member being formed so as to hold the seed substantially in contact with the generally downwardly facing surface of said ejector member, and means for opening said lower valve member and simultaneously operating said ejector member to push the seed generally downwardly toward the ground.

24. In a planter having a hollow runner shank and an upper valve which when open permits seed to drop through said runner shank, the combination of a lower valve, and means for simultaneously opening and closing both valves, including a part in said hollow runner shank pivotally connected with the lower valve and arranged so that at least the upper portion of said part moves away from the path of movement of said seed in said shank during the latter part of its movement when closing said valves.

25. In a planter having a hollow runner shank serving as a seed passage, interconnected upper and lower valve means in the upper and lower ends of said hollow shank and including a member movable with said valve means for opening and closing the lower valve means simultaneously with the opening and closing of the upper valve means, said member extending generally vertically in said shank, and means movably supporting said member so that during the entire period of closing of the valve means all parts of said member move generally in a direction away from the path of said seed in said passage when falling from said upper valve means to said lower valve means so as not to interfere with the movement of the seed through said passage.

26. A planter comprising a seed feeding device, a valve for receiving seed from said seed feeding device and comprising a pair of movably mounted members both curving downwardly and forwardly and normally disposed in contact with each other at their lower ends, and means for moving said members rearwardly and separating their lower ends for ejecting the seed.

27. A planter comprising a seed feeding device, a valve for receiving seed from said seed feeding device and comprising a pair of movably mounted members both slanting downwardly and normally disposed in contact with each other at their lower ends, and means for moving said members rearwardly and separating their lower ends for ejecting the seed.

CHARLES H. WHITE.

CERTIFICATE OF CORRECTION.

Patent No. 2,243,933.                                                      June 3, 1941.

CHARLES H. WHITE.

It is hereby certified that error appears in the printed specification of the above numbered patent requiring correction as follows: Page 1, first column, line 51, for "of" first occurrence, read --or--; page 4, first column, line 5, claim 7, after "valve member" insert --pivotally mounted--; page 5, second column, line 59, claim 27, after "downwardly" insert the words --and forwardly--; and that the said Letters Patent should be read with this correction therein that the same may conform to the record of the case in the Patent Office.

Signed and sealed this 22nd day of July, A. D. 1941.

(Seal)                                                                 Henry Van Arsdale,
Acting Commissioner of Patents.